US010334425B2

United States Patent
Kong et al.

(10) Patent No.: US 10,334,425 B2
(45) Date of Patent: Jun. 25, 2019

(54) APPARATUS AND METHOD FOR CONTROLLING OPERATION OF A DEVICE

(71) Applicant: MAPTI Ventures, LLC, Los Angeles, CA (US)

(72) Inventors: Michael Kong, Los Angeles, CA (US); Mark Madsen, Edmonton (CA)

(73) Assignee: FORCEFIELD ONLINE, INC., Los Angeles, CA (US)

( * ) Notice: Subject to any disclaimer, the term of this patent is extended or adjusted under 35 U.S.C. 154(b) by 0 days.

(21) Appl. No.: 14/250,919

(22) Filed: Apr. 11, 2014

(65) Prior Publication Data

US 2015/0296371 A1   Oct. 15, 2015

(51) Int. Cl.

| | | |
|---|---|---|
| H04W 8/22 | (2009.01) | |
| H04W 8/18 | (2009.01) | |
| H04M 1/725 | (2006.01) | |
| G06F 21/35 | (2013.01) | |
| H04W 4/80 | (2018.01) | |
| H04L 29/08 | (2006.01) | |
| H04W 48/04 | (2009.01) | |
| H04W 4/50 | (2018.01) | |

(52) U.S. Cl.
CPC .............. H04W 8/18 (2013.01); G06F 21/35 (2013.01); H04M 1/72577 (2013.01); H04W 4/80 (2018.02); *G06F 2221/2103* (2013.01); *G06F 2221/2141* (2013.01); *H04L 67/303* (2013.01); *H04M 1/72572* (2013.01); *H04W 4/50* (2018.02); *H04W 48/04* (2013.01)

(58) Field of Classification Search
CPC ....... H04W 4/027; H04W 4/02; H04W 48/04; H04W 52/0251; H04W 12/06; H04W 12/08; H04W 4/001; H04W 4/008; H04W 4/021; H04W 4/04; H04M 1/72577; H04M 1/6075; H04M 1/6091; H04M 2250/10; H04M 2250/02; H04M 1/6083; H04M 1/72519
See application file for complete search history.

(56) References Cited

U.S. PATENT DOCUMENTS

| | | | |
|---|---|---|---|
| 7,876,205 B2 | 1/2011 | Catten et al. | |
| 8,838,088 B1* | 9/2014 | Henn et al. | .................. 455/419 |
| 9,185,135 B2* | 11/2015 | Gupta | ..................... H04L 63/20 |
| 2009/0002147 A1 | 1/2009 | Bloebaum et al. | ........... 340/466 |
| 2009/0029675 A1* | 1/2009 | Steinmetz et al. | ........... 455/410 |
| 2010/0009626 A1* | 1/2010 | Farley | .......................... 455/26.1 |
| 2010/0233959 A1* | 9/2010 | Kelly et al. | .................. 455/41.2 |
| 2011/0009107 A1* | 1/2011 | Guba et al. | ................... 455/418 |
| 2011/0093161 A1* | 4/2011 | Zhou et al. | ..................... 701/33 |
| 2011/0105097 A1* | 5/2011 | Tadayon et al. | ............. 455/418 |

(Continued)

OTHER PUBLICATIONS

International Search Report and Written Opinion dated Jul. 9, 2015 for PCT/US2015/025378.

*Primary Examiner* — Liton Miah
(74) *Attorney, Agent, or Firm* — Mayer Brown LLP (57) ABSTRACT

A method for controlling operation of a device includes detecting the proximity of a beacon or transponder, communicating with a server regarding the identity of the transponder and the device, and controlling the operation of the device according to pre-determined settings. The device may be controlled when it is on or in a vehicle or when it is at a venue. An apparatus for controlling the operation of the device is also described.

32 Claims, 4 Drawing Sheets

(56) References Cited

U.S. PATENT DOCUMENTS

| | | | |
|---|---|---|---|
| 2013/0035063 A1 | 2/2013 | Fisk et al. | |
| 2013/0103290 A1* | 4/2013 | Hardin | H04W 4/02 |
| | | | 701/117 |
| 2013/0143527 A1* | 6/2013 | Randazzo | H04W 48/04 |
| | | | 455/411 |
| 2014/0298403 A1* | 10/2014 | Qureshi | G06F 21/41 |
| | | | 726/1 |

* cited by examiner

FIG. 6

APPARATUS AND METHOD FOR CONTROLLING OPERATION OF A DEVICE

BACKGROUND

Smartphones and similar devices are generally considered to be beneficial because they perform many different functions that previously were performed by separate devices. For example, in addition to allowing a user to talk on a phone, today's smartphone may also be used as a clock, a calendar, an address book, a TV, a messaging device (for text messages and email), a gaming device, an Internet gateway, a word processor, a camera, a photo album, a reading book, a social networking device (via, e.g., Facebook and Twitter), and much, much more.

But that increased functionality also has shortcomings. Inbound telephone calls, text messages, and a wide variety of alerts from applications and social networks can be distracting and, in instances in which the user is operating a vehicle or other machinery, can be very dangerous. Additionally, a user's temptation to send outbound emails or messages, interact with social networking applications, access the Internet, use the camera, play a game, or employ any other such available smartphone function at inappropriate times can be equally distracting and/or dangerous to the user or to others.

In some situations—at school, at work, in a movie theater or concert hall, on an airplane, or in a place of worship—the ubiquity of the smartphone is often an inconvenience and a disturbance. In other situations, such as when the user is driving a vehicle—especially if the user is in charge of a commercial vehicle and responsible for the safety of others, such as a truck, a bus, a taxi or limousine, a train or subway, a boat or ship, or an airplane—such distracting functions on a smartphone can be extremely dangerous to the user and to others.

Where considered appropriate, reference numerals may be repeated among the drawings to indicate corresponding or analogous elements. Moreover, some of the blocks depicted in the drawings may be combined into a single function.

DETAILED DESCRIPTION

In the following detailed description, numerous specific details are set forth in order to provide a thorough understanding of embodiments of the invention. However, it will be understood by those of ordinary skill in the art that the embodiments of the present invention may be practiced without these specific details. In other instances, well-known methods, procedures, components, and circuits have not been described in detail so as not to obscure the present invention.

Embodiments of the present invention may be used when one wishes to control the functionality of a device, such as a smartphone, that has numerous functions, in order to restrict, or temporarily make unavailable, functions that may be deemed distracting, undesirable, or dangerous during certain instances or activities, and also to optimize and enhance functions deemed important or advantageous during those activities. These embodiments allow remote configuration of smartphones and similar devices so that they may automatically switch to a restricted or optimized mode in specific circumstances where such a mode is appropriate and desirable.

Figure 1:
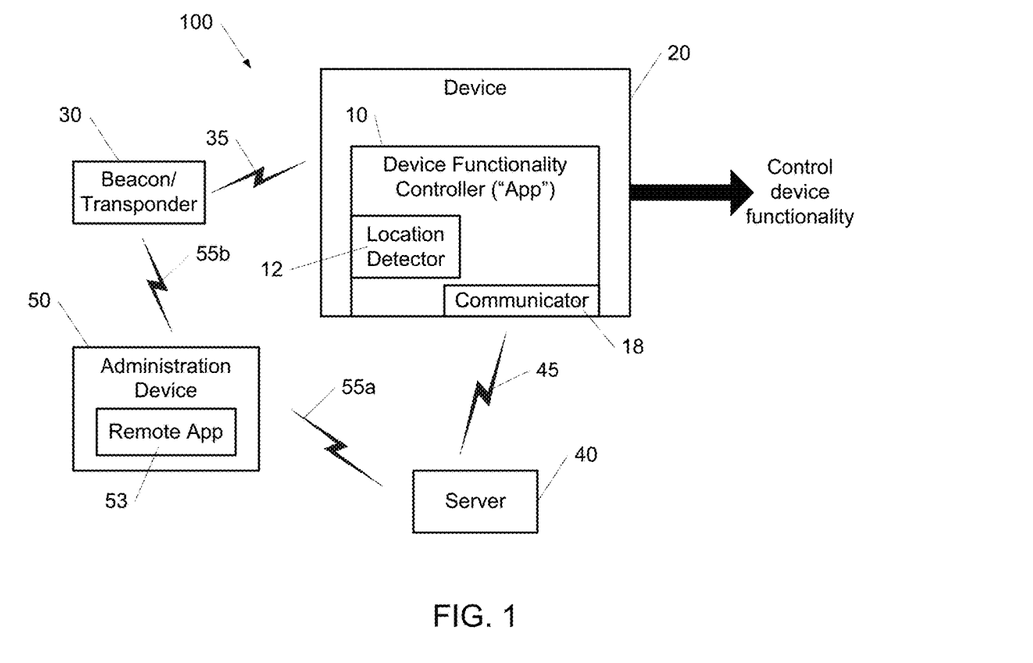
FIG. 1 is a block diagram of a system for controlling operation of a device, according to an embodiment of the present invention.

Reference is now made to FIG. 1, which is a block diagram of a system 100 for controlling operation of a device 20, such as a smartphone. Device 20 may include device functionality controller 10 that may in turn include or access location detector 12 and communicator 18. System 100 may also include beacon 30 (also more generically called a "transponder"), server 40, and administration device 50.

Device 20 may have many functions, and all the functions are generally available to a user. When device 20 moves into proximity of beacon 30, device functionality controller 10 may direct or allow location detector 12 to detect beacon 30 via connection 35. Alternatively or in addition, location detector 12 may detect beacon 30 via connection 35 and inform device functionality controller 10. Communicator 18 may then communicate with server 40 via connection 45. The communications may include informing the server of the beacon's identity, the device's identity, and, possibly, the user's identity. The server then may determine the appropriate functionality for device 20 in the vicinity of beacon 30 for the user. This functionality may come from settings that the user or administrator has configured previously, from default settings associated with beacon 30, or from information that server 40 receives after prompting the user to configure such settings.

Device 20 may be any multifunction device, typically portable, including a cellphone, a smartphone, a personal digital assistant (PDA), a laptop computer, a palmtop computer, a netbook computer, a tablet computer, an e-reader, or a wearable computer. Device functionality controller 10 may be embodied in an "App" (i.e., a software application) that may reside on the device itself. Beacon 30 may be any localized signal transmission device communicating via a number of protocols including, but not limited to, a Bluetooth beacon, an iBeacon, a Bluetooth Low Energy (BLE) beacon, an RFID (radiofrequency identification) tag or transponder, or an NFC (near-field communications) tag or transponder. The beacon may operate using a low energy protocol, and may include short-range, medium-range, and longer-range location protocols, depending on the desired or intended use. The range of the beacon or transponder may be variable or configurable by the user, an administrator, or a manufacturer, for example. The beacon or transponder may solely transmit signals, may solely receive signals, or may both transmit and receive signals. Connection 35 may be wireless or wired, or a combination, and may be short-range or longer range. Connection 45 may be wireless or wired, via satellite, telephone network, cellular network, the Internet, Wi-Fi, over public or private networks, via Ethernet, or over local, wide, or metropolitan area networks (i.e., LANs, WANs, or MANs). Location detector 12 may detect beacons and transponders and may also be able to detect and/or communicate with other wireless contact points, such as in a GPS or Wi-Fi system.

Administration device 50 may be a device, such as another smartphone or personal computer or tablet, operated by a person, such as an administrator, who may be a parent, employer, school administrator, or other person who owns or controls the vehicle or venue in which device 20 is being controlled. The administrator may also be the user, but may use administration device 50 in a remote manner to set up device 20 and device functionality controller 10. Administration device 50 may include or access remote app 53, which is able to configure the settings for device 20 and device functionality controller 10. Remote app 53 may be similar to device functionality controller 10 that resides on device 20, or it may have more or fewer functions, features, or settings. Administration device 50 may communicate with server 40 via connection 55a, which is similar to connection 45, or with beacon 30 via connection 55b, which is similar to connection 35.

The blocks shown in FIG. 1 are examples of modules that may comprise system 100, device 20, device functionality controller 10, and administration device 50, and do not limit the blocks or modules that may be part of or connected to or associated with these modules. For example, location detector 12 and communicator 18 may be part of device 20 and physically separate from device functionality controller 10. Other functionality within device 20 may be used to operate and/or control location detector 12 and communicator 18. Administration device 50 may include remote app 53, or may just be able to access remote app 53. The blocks in FIG. 1 may be implemented in software or hardware or a combination of the two, and may include a processor, a memory, and software instructions executed by the processor.

Figure 2:
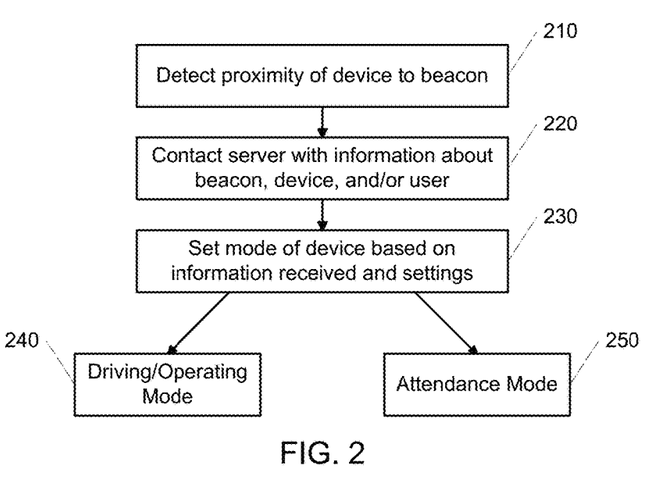
FIG. 2 is a flowchart illustrating the general operation of the system of FIG. 1, according to an embodiment of the invention.

FIG. 2 is a flowchart illustrating the general operation of system 100, according to an embodiment of the invention. In operation 210, the proximity of device 20 to beacon 30 is detected. Next, server 40 may be contacted in operation 220 via connection 45 with information about beacon 30, device 20, and/or the user. Then, in operation 230, the operating mode of device 20 may be set and its functionality controlled based on information received and settings configured for the beacon, device, and/or user.

A number of modes or scenarios are contemplated for the present invention. One mode is Driving/Operating Mode 240, suitable for driving a car, bus, truck, or train, for piloting a plane, for riding a bicycle or motorcycle, or for operating complicated or potentially dangerous machinery—any situation in which the user is controlling another object and the multi-functionality of device 20 may cause dangerous or undesirable distractions. Another mode is Attendance Mode 250, suitable for attending school, work, a house of worship, a theatrical or live event, or for being a passenger on an airplane—any situation in which the user is present in a venue and the multi-functionality of device 20 may distract the user or may be a distraction or nuisance to others. Other modes will become apparent to those of ordinary skill in the art.

Driving/Operating Mode

For simplicity's sake, Driving/Operating Mode will be described herein in terms of driving a car, since it is envisioned that driving a car will be the most frequent activity for this Mode. Also for simplicity's sake, a smartphone will be used as device 20. The teachings can easily be extended to the driving of other vehicles and uses of other devices that were enumerated above.

One of the objects of the present invention in Driving/Operating Mode is to remove distracting and non-essential functions of device 20 while driving. The controlling functionality of Driving/Operating Mode may be embodied in an "app" (i.e., a software application) that may reside on the device itself. The device user or an administrator, such as a parent or employer or other person who owns or controls the vehicle or conveyance, may decide which functions will be allowed while driving, while disabling the use of the most distracting and dangerous functions. Examples of allowed functions may include ability to use the telephone, listen to music, or access navigation tools, while other functions may be disabled in order to restrict the user from sending or receiving texts or emails, receiving inbound alerts of all kinds, accessing social networking sites, browsing the Internet, purchasing products, playing games, using the camera to take photos or videos, looking at photos or videos, using word processing applications, reading books or accessing other text documents, checking the calendar, accessing system apps that check the weather or stock market data, or other functions. For certain users, such as teens who are just learning to drive, there may be no allowed functions (essentially turning off the device), or some functions may be allowed in certain circumstances, such as using a telephone only when the car is not moving.

The choice of allowed and disabled functions may be made via configuration of account settings. This may be performed by the user on device 20 itself, via the App, or may be performed by the user or an administrator on a different device, such as administration device 50. Configuration settings will then be stored on the server for retrieval when the App is engaged.

Figure 3:
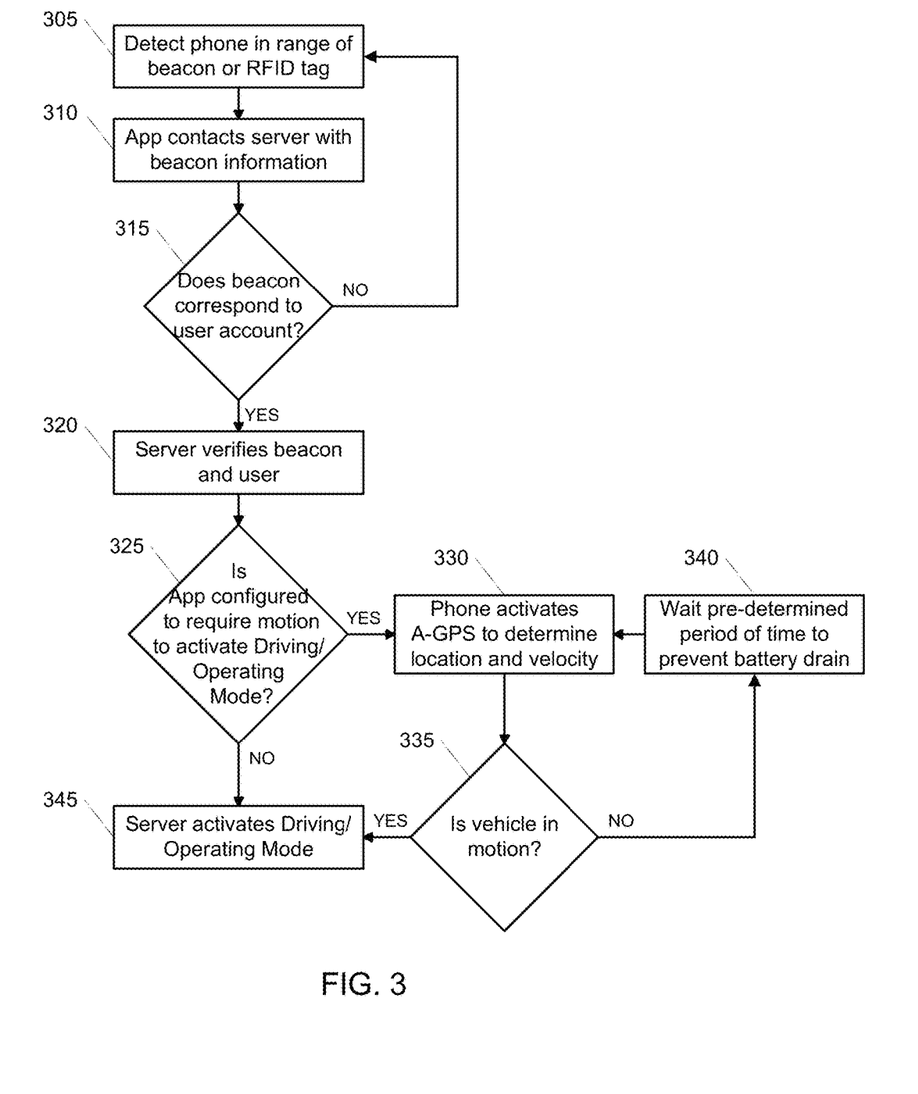
FIG. 3 is a flowchart illustrating entry into Driving/Operating Mode, according to an embodiment of the invention.

Reference is now made to FIG. 3, which is a flowchart illustrating entry into Driving/Operating Mode, according to an embodiment of the invention. In operation 305, device 20, here, a smartphone, may be detected in range of a beacon or an RFID tag or transponder. The phone may detect the beacon, but in some embodiments the beacon may detect the phone; in such a scenario, the phone may also function as a beacon. The detection range may vary based on the type of vehicle, size of vehicle, detection protocol, location of beacon on the vehicle, frequency of "pinging" by the beacon, or other factors, but may be about 10 feet or 3 meters in a typical scenario.

Figure 4:
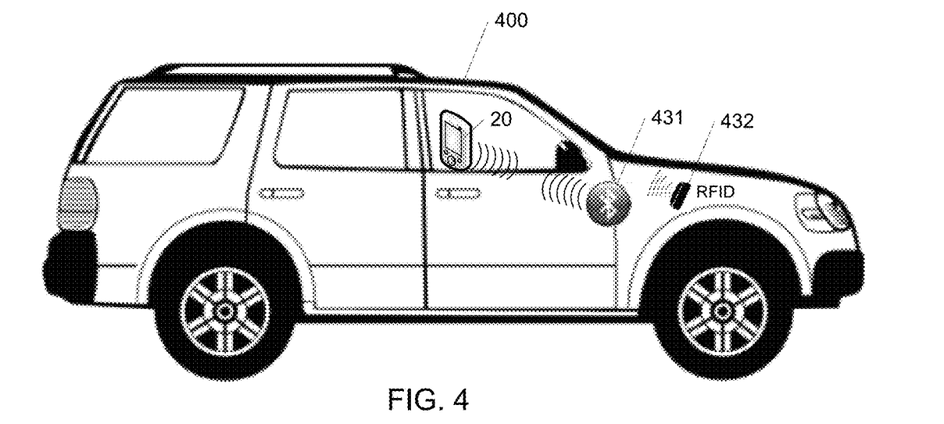
FIG. 4 is a schematic diagram illustrating an arrangement in which a vehicle may be used according to an embodiment of the present invention.

This arrangement is illustrated in FIG. 4, in which vehicle 400 has attached to it Bluetooth beacon 431 and/or RFID tag or transponder 432. There will usually only be one beacon or transponder in the vehicle, but some embodiments may include more than one transponder. Location of the beacon or transponder on vehicle 400 may vary—it may be under the hood, on the windshield, on the back or side window, in the trunk, or in some other place on the vehicle. Depending on the size of the vehicle, the distance between the beacon and the driver may dictate optimal placement of the beacon. In addition, the earlier the device detects the beacon, the more likely it will be that the Driving/Operating Mode will be engaged before the vehicle is actually driven.

In one embodiment, a beacon may be installed on the car by the user or administrator, or it may be installed by the vehicle manufacturer. In some embodiments, the beacon may be detectable by everyone who has the App on his or her smartphone; in other embodiments, the beacon may be registered by a user or administrator so that the beacon is recognized only by intended people. For example, parents may want the beacon on the family car to recognize their teen so as to control the teen's smartphone when driving, but not to recognize the teen's friends who may also be in the car, yet do not need their smartphones to be controlled. Similarly, a taxi operator or dispatcher may want the beacon recognized only by the taxi drivers' devices, but not by the passengers' devices. In other scenarios, a parent may want the smartphones of all of the passengers in the car to be similarly controlled, again so as to minimize distractions to the driver. Registration may be performed by having the user or administrator or taxi operator or dispatcher scan a bar code on the beacon or enter a beacon identification code into the App, and the smartphone App will look only for beacons that are registered.

Returning to FIG. 3, after the beacon is detected, in operation 310 the App on the phone may contact server 40 with information about the beacon and the device. Beacon information may include its location, type of vehicle on which it is placed, owner of the vehicle and/or administrator of the user account, its UUID (universally unique identifier), signal strength, battery level, etc. The system may use this information to keep track of the user and make sure the beacon is maintained. For example, if the battery level of the beacon is too low, the system may notify the user or administrator to have the battery replaced soon. In another embodiment, the beacon could send a push notification to the phone and then on to the user or administrator via the server when the battery gets below a certain level, for example, 20%. Device information may include the phone number of the device, the identity of the user, a MAC address of the device, the current location of the phone, the velocity of the phone, distance to the beacon, or other information.

In the event that the smartphone identifies the beacon inside the vehicle but is unable to access the server because of blocked or poor cellular coverage or access to Wi-Fi or other service, the device may display an alert notification warning the user that the smartphone is not in Driving/Operating Mode, to refrain from engaging in inappropriate or dangerous activities while driving, and to proceed with appropriate caution until such connection is established and the smartphone enters Driving/Operating Mode.

In operation 315, the server may ask whether the beacon corresponds to the account of the user and/or the administrator, such as if the beacon is registered to the user, as described previously. If not, such as if the user is a passenger, the flow returns to operation 305 to detect the phone in range of another beacon. If the beacon corresponds to the account of the user and/or the administrator, then, in operation 320, the server may verify the beacon and the user and retrieve the user's configuration settings.

One of the configuration settings is whether the App requires motion to activate Driving/Operating Mode, as shown in operation 325. If not, then the server may immediately activate Driving/Operating Mode in operation 345. If the App requires motion to activate Driving/Operating Mode, then the phone may activate GPS (global positioning system), A-GPS (assisted GPS), or other hybrid positioning system in operation 330 to determine location and velocity of the vehicle, as will now be described.

Figure 5:
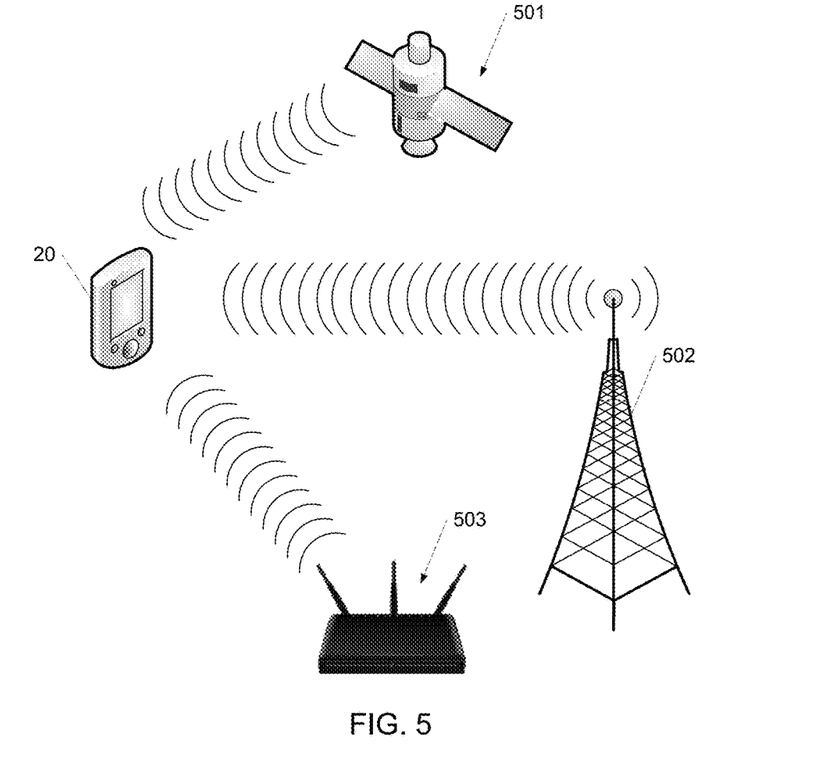
FIG. 5 is a schematic diagram illustrating a use of assisted GPS, according to an embodiment of the present invention.

Depending on the location of the device and vehicle, such as in a garage, in a city, or in another inaccessible location, standard GPS using only satellites may not be able to locate the phone, or may take some time, on the order of minutes or longer to do so. By that time, the user may have begun to drive the vehicle. Assisted GPS, illustrated in FIG. 5, tries to locate device 20 using detection modes in addition to satellite 501, so as to decrease the detection time. These additional modes include triangulation based on the location of cell towers 502 and Wi-Fi access points 503. IP addresses may also be used to assist the GPS.

Using A-GPS or another positioning system, the phone may determine in operation 335 whether the vehicle is in motion. If not, then in operation 340 the phone may wait a pre-determined period of time before performing operation 330 again to locate the vehicle and determine its velocity. This pre-determined period of time prevents unnecessary drain of the device's battery because of too frequent location inquiries. Once the phone determines in operation 335 that the vehicle is moving, the server may activate Driving/Operating Mode in operation 345.

Figure 6:
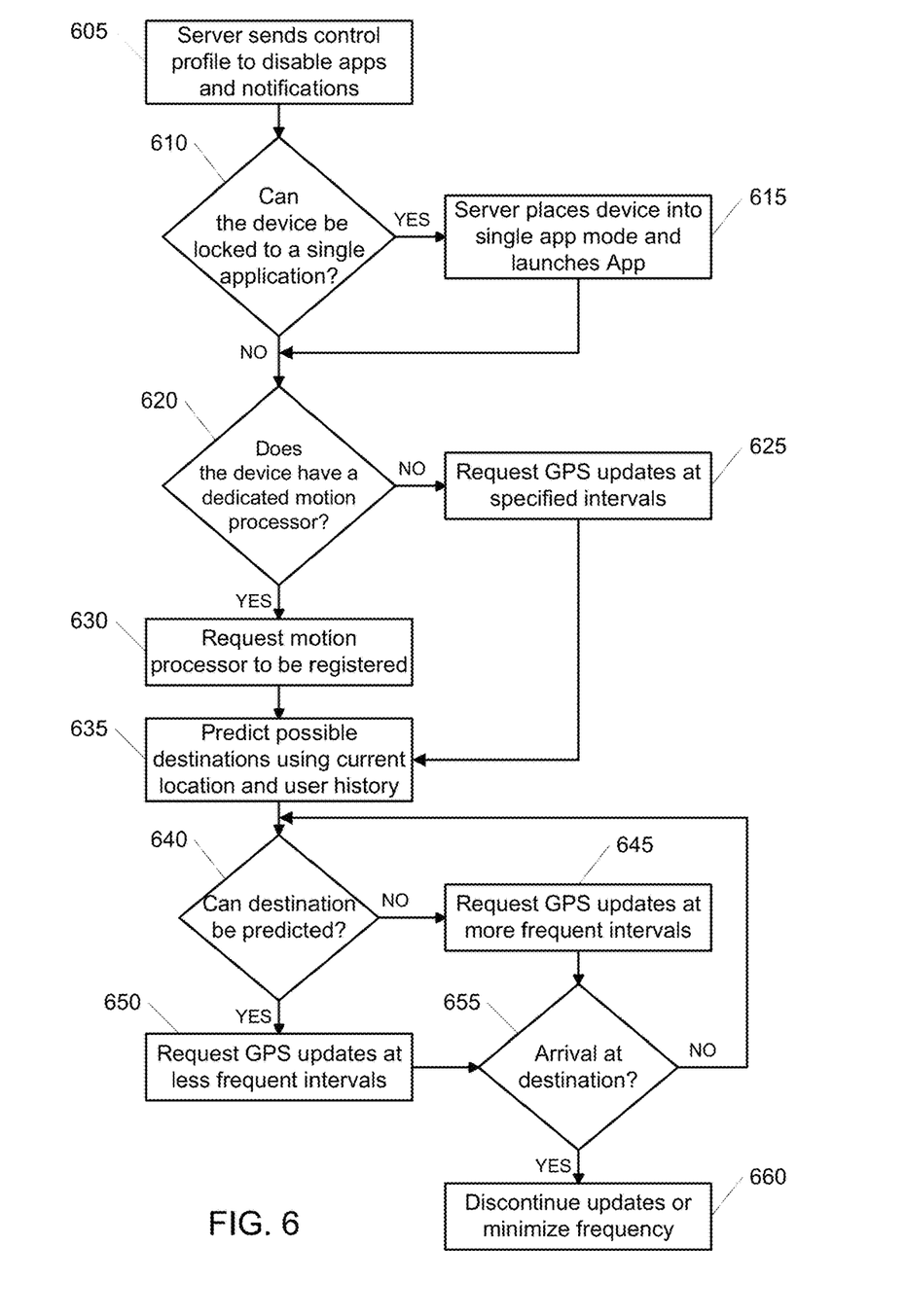
FIG. 6 is a flowchart illustrating a Driving/Operating Mode embodiment of the present invention.

Once the vehicle enters Driving/Operating Mode, the flow shifts to FIG. 6, which is a flowchart illustrating Driving/Operating Mode itself, according to an embodiment of the invention. In operation 605, the server may send a control or restriction profile, such as a mobile device management (MDM) profile, to the phone to disable applications and notifications, according to the configuration settings in the user's account. As mentioned before, this may involve disabling all applications and functions of the phone, or just disabling the most distracting functions, such as text messaging, email, social media, photos, and alerts, and other distracting functions, especially those that appear on the lock screen. In operation 610, the server may ask whether the phone can be locked to a single application or placed in a "single-app" mode. This mode forces the phone to be controlled by a single application, such as device functionality controller 10. If the phone can be locked to a single application, then in operation 615, the server may place the phone in such a mode and launch the App (e.g., device functionality controller 10). If the phone cannot be locked to a single application, then the control profile may provide as much control as is possible with the specific phone.

Once the phone is locked to a single application (if available) and the App is launched on the phone to control the phone's functionality, other operations may come into play, such as predicting the user's destination and functionality to be used at the destination. In operation 620, the App may ask whether the device has a dedicated motion processor. If so, in operation 630, the App may request the motion processor to be registered, so that the device may receive from the motion processor periodic updates to the user's location and velocity. If there is no dedicated motion processor, then in operation 625 the App may request GPS updates at specified intervals to determine location and velocity of the vehicle. Either via the motion processor or via GPS updates, in operation 635, the App may attempt to predict possible destinations and arrival times using the current location and the user's history. For example, over time, the App will learn the usual locations that the user travels to, such as school, work, friends' houses, the gym, etc. Knowing these possible destinations, the App may calculate the distance between the user's current location and each of these destinations, and those whose distances decrease are more likely to be the final destination. In operation 640, the App asks whether the destination can be predicted. If so, then the App may in operation 650 request GPS updates at less frequent intervals (to save battery life). If the destination cannot be predicted, then, in operation 645, the App may request GPS updates at more frequent intervals to make sure it keeps track of the user. In operation 655, the App asks whether the user has arrived at the destination. If so, in operation 660, the updates may be discontinued or their frequency minimized. If the user has not arrived at the destination, the flow may return to operation 640 to determine whether the destination may currently be predicted, and the flow may continue until the user arrives at the destination.

Besides the operations shown in FIGS. 2, 3, and 6, other operations or series of operations may be used to control the operation of a user's device. As mentioned previously, instead of the phone detecting the beacon, the beacon could detect the phone; the phone in that case may act as a beacon. Moreover, the actual order of the operations in the flowcharts is not intended to be limiting, and the operations may be performed in any practical order. Also, some tasks that are described as being performed by the server may be performed by the App in other embodiments, and vice versa. For example, some operations, e.g., determination of existence of a motion processor or calculations of destination and arrival, may be performed by the server or the App—the allocation or division of tasks may be based on power-saving priorities or profiles, or whether there is connectivity with the server at the time.

Driving/Operating Mode may be adapted for use with vehicles other than a car. In a truck, bus, taxi, limousine, train, subway, boat, or plane, or any scenario in which the driver or operator is conveying or may be responsible for others, the smartphone may be configured to a specific beacon designed only to respond to the driver's or operator's specific phone, not affecting any of the other phones that may also be within range of the beacon. This would allow the owner of a bus company to ensure that the driver's smartphone is in safe Driving/Operating Mode while the phones of the passengers are unaffected. In other embodiments in which a smartphone is not registered with a beacon, the beacon may be placed close to the driver's or pilot's seat so that passengers may still use their phones if desired. On a bicycle or motorcycle, the beacon may be able to use less power (if that is an option), since the distances involved are smaller.

Attendance Mode

Besides driving, the App may be used in Attendance Mode. This mode may apply when a user is, for example, at school, at work, at a house of worship, on an airplane, or at a theatre or other live performance hall—any venue in which the multi-functionality of device 20 may distract the user from carrying out the task at hand or distract others in attendance. The App may be controlled by the user or by an administrator, such as a parent, teacher, principal, employer, or other person who owns or controls the venue. Most of the same functions of Driving/Operating Mode may be useful, except constant or regular location and velocity updates may not be as necessary or may be more easily predicted.

At a school, for example, beacons could be located at each classroom and the library, at the entrance to the school, or throughout the entire school. While in class, the App may disable texting, emailing, social networking, games and other inappropriate and distracting functions on the smartphone, tablet, laptop computer or other device, while at the same time it may enhance and optimize the experience by allowing access to school books or other texts not normally accessible when the device is not in Attendance Mode. The user's account may be further configured with the user's schedule to allow for more restrictions during such periods as school chapel, or to allow for increased or full functionality during free periods or lunchtime. A device in Attendance Mode may also be programmed to enter into an emergency mode during a crisis so that the location of each student or user can be immediately determined and their smartphones or other devices can be used to display important messages, instructions, contact information or other relevant and important content.

At work, beacons could be located in the workplace, so as to prevent users (i.e., workers) from accessing undesired applications or websites, games, social media, or other functions deemed by the employer to be irrelevant or time-wasting. The users' accounts could also be configured with their work schedule, so as to allow expanded access to the device's other functions during breaks or lunch.

At a house of worship, beacons may be located at each pew, or fewer, stronger beacons may be located at the entrance to or in the middle of the building. In such a location, the App may automatically put the phones into silent ring or vibrate mode so as not to interrupt services or disturb other worshippers, and may at the same time enhance and optimize the experience by providing access to religious applications, such as the Bible, a prayer book, or a hymnal. The App may also allow users to make contributions or payments to the house of worship via their phones instead of by using cash.

At a theater or any venue which shows movies, plays, musicals, concerts, or sporting events, the App may be useful in disabling functions on a user's device that may be distracting to other patrons. Beacons may be located at each row or located in various places in the venue. Once the App recognizes the beacon and places the device into Attendance Mode, the App may limit all unnecessary and distracting functions, place the device into silent ring or vibrate mode, and even reduce the brightness of the screen to an optimal low light. The App may also disable the camera function during such events to prevent the "bootlegging" or illegal photography, videography, or recording of protected material, while at the same time enhancing and optimizing the experience by allowing the device to use its speakers for sound or sound effects, display the user's ticket, allow access to certain seating sections, display directions to bathrooms, food vendors, and retailers within the venue, and offer the user deals or promotions on products and services while inside the venue.

On an airplane, the App may be used to put passengers' devices automatically into "airplane mode" so that they no longer receive or transmit data via cellular connections which can interrupt pilot communications and the functioning of the aircraft. The App may also enhance and optimize the experience by offering access to menus for food for purchase, access to in-flight entertainment, as well as relevant travel information such as baggage claim and connecting gate information. The App may also be used to allow the user to make duty-free and other retail purchases, and to pay for any and all such services directly through the device.

Registration of beacons may be performed in a number of ways in Attendance Mode. At school or at work, students may be required to enter the beacons' identification codes into their App or to scan the beacons' bar codes on the first day of school. If a student registers for school online or electronically, such beacon registrations may be performed automatically based on the student's schedule. Or, for schools that provide devices to students, the beacon identification codes may be automatically entered onto the device by the school or the device manufacturer. For scenarios that involve the use of a ticket, such as a theatre or an airplane, upon the purchase of the ticket (or the receipt of a boarding pass for an airplane), the beacon identification code may be transferred to the user's App automatically, and registration could expire automatically after the event is over or the ticket is used.

In Attendance Mode, server 40 may be remote and controlled by a third party that supplies the App, much as may occur in Driving/Operating Mode. Alternatively, because locating beacons and users' devices may be more difficult since they will likely be inside, there may be subsidiary servers at each venue to assist with server processing, and that may communicate with the beacons using a local communication system and/or a local positioning system. The subsidiary servers may contain the information included on the third-party server, and may communicate with the third-party server regularly or periodically for synchronization purposes, or may be connected to the Internet to act as a conduit to the third-party server to communicate in real-time or near-real-time.

Although phones may typically detect beacons, in Attendance Mode, phones may be detected by the venue. In one embodiment, the phone may act as a beacon and be detected by sensors at the entrance or inside of the venue. In another embodiment, a phone may connect to the venue's local network, such as a Wi-Fi network, and that network could recognize the phone as being registered to the system, and begin to control the phone's functionality.

One benefit of the present invention is to prevent the many functions of smartphones and similar devices from placing users and others in danger. Another benefit is to prevent the devices from distracting users and those around users while performing other tasks. Using beacons to detect whether the device is in range uses less power than having the device repeatedly contact a satellite or other positioning system for location and velocity information. And using beacons allows passengers in conveyances to still use their devices even though the vehicle in which they are riding is moving, unlike in other arrangements in which the motion of the device (due to the motion of the vehicle) may prevent the device from functioning.

The device functionality controller may be used on various device platforms, such as iOS, Android, Windows, BlackBerry, Mac, and other platforms and operating systems that are currently used or may be used in the future to control such devices. The device functionality controller may be used on platforms that include a supervised or supervisory mode, which may allow an administrator to set the device to be locked to a single application or placed in single application mode (described above), so that the administrator may be able to control what is allowed on a device and at which times. Some devices may already be in supervised mode when purchased; others may later be placed in supervised mode. This may be performed via the App by the user, the administrator, e.g., a parent or employer, so that the App is always available to the user.

Aspects of the present invention may be embodied in the form of a system, a computer program product, or a method. Similarly, aspects of the present invention may be embodied as hardware, software or a combination of both. Aspects of the present invention may be embodied as a computer program product saved on one or more computer-readable media in the form of computer-readable program code embodied thereon.

For example, the computer-readable medium may be a computer-readable signal medium or a computer-readable storage medium. A computer-readable storage medium may be, for example, an electronic, optical, magnetic, electromagnetic, infrared, or semiconductor system, apparatus, or device, or any combination thereof.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Computer program code in embodiments of the present invention may be written in any suitable programming language. The program code may execute on a single computer, or on a plurality of computers. The computer may include a processing unit in communication with a computer-usable medium, wherein the computer-usable medium contains a set of instructions, and wherein the processing unit is designed to carry out the set of instructions.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

The invention claimed is:

1. An apparatus for controlling operation of a device while in a vehicle, comprising:
   a supervisor application configured on the device;
   a detector within the device to detect proximity of a transponder positioned on or in the vehicle; and
   a communications mechanism configured to communicate with a server to confirm the identity and signal strength of the transponder,
   wherein the server determines appropriate functionality for the device according to pre-determined settings based on the identity and signal strength of the transponder, wherein the server communicates the appropriate functionality to the device by sending the device a configuration profile, and
   wherein the server further places the device into a single application mode that operates according to the pre-determined settings configured in the configuration profile;
   wherein a positioning system monitors the position and velocity of the vehicle, predicts destination arrival based on the position and velocity monitoring and communicates destination arrival to the server;
   wherein the positioning system comprises a global positioning system (GPS) and wherein the apparatus controls the operation of the device according to the configuration profile and the position and velocity monitoring.

2. The apparatus of claim 1, wherein the apparatus does not require the use of information from the vehicle's on board diagnostic system to control the operation of the device.

3. A mobile device application for restricting one or more mobile device use parameters based on a mobile device management profile that is enabled by a server in response to the mobile device's relative location with a vehicle, comprising:
   a detector within the mobile device configured to detect the relative location of a transponder positioned on or in the vehicle based on the signal strength of the transponder,
   a communications mechanism within the mobile device configured to communicate with a server that allows the server to confirm the identity of the transponder and the mobile device and the relative location between the transponder and the mobile device, wherein the server determines the appropriate functionality for the mobile device according to pre-determined use parameter settings based on the identity of the transponder and the mobile device and the relative location between the transponder and the mobile device, wherein when the server determines that the mobile device is positioned in proximity to the vehicle's driver seat, the server communicates the appropriate functionality to the mobile device by sending the mobile device a mobile device management profile containing restricted use parameters according to the predetermined settings stored on the server, wherein the mobile device management profile controls the operation of the mobile device according to restricted use parameters.

4. The mobile device application of claim 3, wherein the transponder is registered to the mobile device.

5. The mobile device application of claim 3, wherein a positioning system monitors the position and velocity of the vehicle and communicates the position and velocity to the server.

6. The mobile device application of claim 5, wherein the positioning system comprises a global positioning system (GPS).

7. The mobile device application of claim 5, wherein the positioning system comprises an assisted global positioning system (A-GPS).

8. The mobile device application of claim 3, wherein the device comprises a motion processor.

9. The mobile device application of claim 3, wherein the device of only a driver of the vehicle is controlled.

10. The mobile device application of claim 3, wherein the device of a passenger of the vehicle is controlled.

11. The mobile device application of claim 3, wherein the restricted use parameters comprise disabling lock screen notifications.

12. The mobile device application of claim 3, wherein the restricted use parameters comprise one or more of disabling text messaging, email messaging, social networking functions, and lock screen notifications.

13. The mobile device application of claim 3, wherein at least one of the mobile device management profile and the mobile device application restores full functionality to the mobile device when the vehicle arrives at a destination.

14. The mobile device application of claim 3, wherein the pre-determined use parameter settings are made by a remote device.

15. The mobile device application of claim 3, wherein the transponder is a bluetooth beacon.

16. The mobile device application of claim 15, wherein the transponder is a bluetooth low-energy beacon.

17. The mobile device application of claim 3, wherein the transponder is an RFID tag.

18. The mobile device application of claim 3, wherein the transponder is a near-field communications tag.

19. The mobile device application of claim 3, wherein the mobile device application does not require the use of information from the vehicle's on board diagnostic system to control the operation of the mobile device.

20. The mobile device application of claim 3, wherein at least one of the mobile device management profile and the mobile device application restores functionality to the mobile device when the mobile device is removed from the vehicle.

21. The mobile device application of claim 3, wherein the communications mechanism communicates with the server when the mobile device is removed from the vehicle.

22. The mobile device application of claim 3, wherein the pre-determined use parameter settings are configured by a remote device.

23. The mobile device application of claim 3, wherein the restricted use parameters are configured by a remote device.

24. The mobile device application of claim 23, wherein the remote device communicates with the server to configure the restricted use parameters.

25. The mobile device application of claim 24, wherein the remote device belongs to a parent or administrator.

26. The mobile device application of claim 3, wherein the pre-determined use parameter settings can be configured remotely by a parent or administrator.

27. The mobile device application of claim 3, wherein the restricted use parameters can be configured remotely by a parent or administrator.

28. The mobile device application of claim 3, wherein the restricted use parameters include blocking inbound communications.

29. The mobile device application of claim 28, wherein the inbound communications comprise one or more of text messages, emails, alerts, notifications, and phone calls.

30. The mobile device application of claim 28, wherein the restricted use parameters further include restrictions on the ability to use applications on the mobile device.

31. The mobile device application of claim 3, wherein the restricted use parameters include blocking outbound communications.

32. The mobile device application of claim 31, wherein the outbound communications comprise one or more of text messages, emails, alerts, notifications, social media and phone calls.

* * * * *